United States Patent Office 3,489,003
Patented Jan. 13, 1970

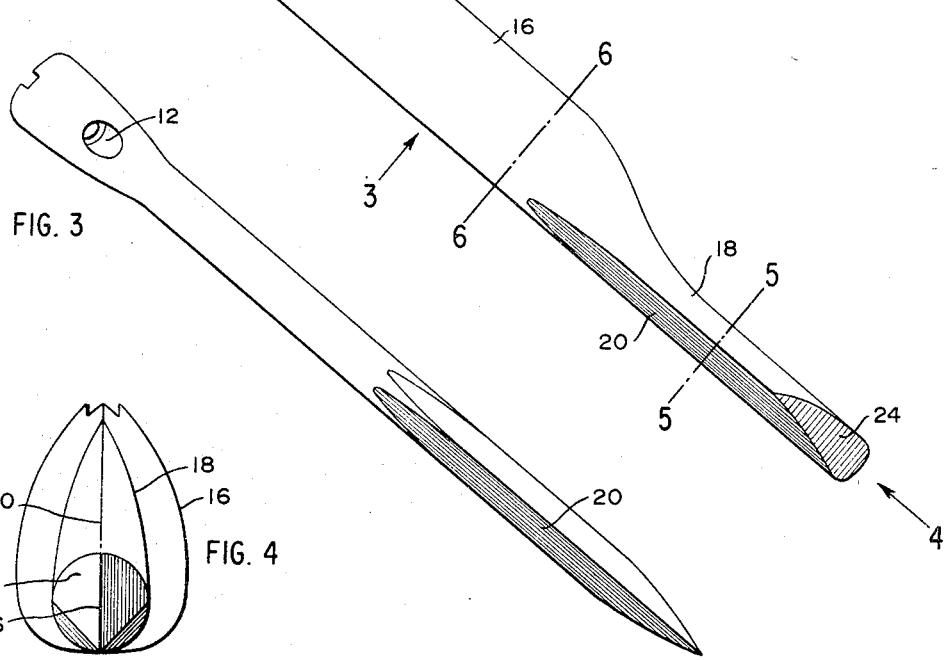

3,489,003
MARINE SPEEDOMETER
Robert D. Ogg, North Windham, Maine, assignor to The Eastern Company, Naugatuck, Conn., a corporation of Connecticut
Filed Oct. 9, 1968, Ser. No. 766,253
Int. Cl. G01c 21/10
U.S. Cl. 73—186   4 Claims

ABSTRACT OF THE DISCLOSURE

The invention relates to a device for measuring the speed of a vessel through the water and comprises a speed-responsive strut adapted to be mounted on the hull and having a streamlined root portion adjacent the hull, a drag responsive intermediate portion provided with a generally wedge-shaped leading margin, and a tapered extremity, the combination of the wedge-shaped leading margin of the intermediate portion and the tapered extremity being effective to eliminate vortices and eddies which introduce error-producing oscillations of the strut.

---

One form of marine speedometer has utilized a speed-responsive strut mounted to extend outwardly from the hull of a vessel and connected at its inner end to a transducer adapted to generate a signal proportional to the drag exerted on the strut as the vessel moves through the water at various speeds. Such struts have conventionally included a root portion of streamlined shape occupying a zone in the immediate vicinity of the hull. Because of its streamlined shape this root portion is not responsive to the drag exerted by the layer of liquid immediately adjacent the surface of the hull. Struts of this sort have conventionally also included an outer cylindrical portion which is responsive to the drag of the water. Theoretically such a strut responds as the square of the speed of the vessel through the water. It has been found, however, that struts of that character do not respond linearly as the square of the speed but are effected by vortex phenomena which bring about oscillations of the strut both vertically and laterally and introduce serious errors in the response of the strut, errors which in certain ranges exceed 20%.

The most important object of this invention is to improve the accuracy of marine speedometers.

An important feature of the invention resides in providing a strut having a streamlined root portion, an intermediate portion having a substantially wedge-shaped leading margin, and an otuer end portion tapering to a relatively thin edge, the edge running at right angles to the axis of the wedge-shaped leading margin of the intermediate portion. It has been found that a strut of that configuration responds linearly, not as the square of the speed of the vessel through the water, but rather as a power of the speed ranging from about 1.6 to 1.9. The special contour results in eliminating vortex action and resulting oscillations both vertically and laterally. By appropriate circuitry the response of this strut can be converted into energy operating a visual display device, such as a pointer playing over the surface of a suitably calibrated dial.

These and other objects and features of the invention will more readily be understood and appreciated from the following detailed description of a preferred embodiment thereof selected for purposes of illustration and shown in the accompanying drawing, in which:

FIG. 1 is a view in side elevation of a speed-responsive strut constructed in accordance with the invention, FIG. 2 is a plan view of the strut shown in FIG. 1, FIG. 3 is a bottom plan view of the strut shown in FIG. 1, FIG. 4 is a view in end elevation of the strut, and FIGS. 5 and 6 are views in cross section taken through the strut along the lines 5—5 and 6—6 of FIG. 1.

As shown in the drawing the strut, which may conveniently be molded of plastic, carved from wood, or otherwise formed of suitable material, comprises an elongated member including a base 10 provided with a counterbored hole 12 and an aperture 14 adapted to receive a centering pin, the base providing means by which the strut can be bolted or otherwise secured to a part of the speedometer housing a suitable transducer (not shown). As an example of the instrument parts not shown herein we refer to United States Patent No. 3,287,968 granted Nov. 29, 1966 to T. W. Kenyon and entitled "Boat Speedometer."

The base 10 merges integrally into a root portion 16, shown in cross-section in FIG. 6. The root portion is of conventional streamlined design having a blunt leading edge and a relatively sharply tapered trailing edge. As the vessel moves through the water, a layer of water immediately adjacent the hull is carried along with it, it being therefore undesirable to have a strut configuration operating in that layer which would respond significantly to the action of the skin layer of water. Since the root portion is effectively streamlined, the drag on it is inconsequential.

The streamlined root portion of the strut merges smoothly into an intermediate portion 18 of significantly smaller cross-section, and the intermediate portion is provided with a substantially wedge-shaped leading edge or margin 20 shown in cross-section in FIG. 5, the trailing edge being smoothly rounded. It has been found that this configuration of the intermediate portion of the strut substantially eliminates vortex action, such as the Karman vortices. Such vortices subject a cylindrical strut to more or less regular pressure pulses which cause the strut to oscillate and give false readings. However, while the wedge-shaped leading edge of the intermediate portion of the strut eliminates lateral oscillation of the strut, it has been found that if the intermediate portion terminates in a cylindrical or blunt extremity, the strut will continue to exhibit oscillations in the vertical plane. That problem has been successfully solved by providing the strut with a terminal portion 24 terminating at its extremity in a relatively thin edge 26 running vertically and at right angles to the axis of the wedge-shaped leading margin of the intermediate portion 18.

Tank tests have shown that a strut constructed as above described responds linearly at about the 1.85 power of the speed of the vessel through the water, the strut operating smoothly and without perceptible oscillation either in the lateral or vertical planes. A series of such struts, differing in dimensions, have given results in the range of from the 1.6 to the 1.9 power of the speed through the water. The result is a marine speedometer of greatly improved accuracy.

It is to be understood that the strut of the invention is not limited to its association with any particular circuitry or display device. It may be associated with a variety of transducing devices such as strain gauges, piezo electric crystals, photocell and shutter combinations or magnetostriction transducers. In each case the transducer has an output signal related to the drag encountered by the strut.

Those skilled in the art will readily appreciate that the structure herein described is but one embodiment of the invention and that various modifications will suggest themselves, as determined by the size of the vessel and the speed range to be measured, for example.

I claim as new and desire to secure by Letters Patent of the United States:

1. Speed-responsive strut comprising an elongated member including a streamlined root portion, an intermediate portion having a substantially wedge-shaped leading edge, and a terminal portion tapering to a thin edge, said thin edge being perpendicular to the axis of said leading edge.

2. Speed-responsive strut comprising three portions,
a root portion having a blunt leading edge and streamlined contour,
an intermediate portion having a wedge-shaped leading edge and an arcuate trailing edge, and
a terminal portion tapering at its extremity to a thin edge disposed at a right angle to the leading edge of said intermediate portion.

3. A speed-responsive strut for a marine speedometer, the strut comprising an elongated member having:
a base,
a streamlined root portion,
an intermediate portion having a wedge-shaped leading margin and a rounded trailing margin,
and a terminal portion tapering to a thin edge runing perpendicular to the axis of said wedge-shaped leading edge.

4. A speed-responsive strut for a marine speedometer, the strut comprising,
a root portion streamlined in cross section, having a blunt leading edge and a tapered trailing edge,
an intermediate portion having a wedge-shaped leading edge,
and a terminal portion tapering to a thin extremity.

References Cited

UNITED STATES PATENTS 3,287,968  11/1966  Kenyon _____ 73—186

DONALD O. WOODIEL, Primary Examiner